United States Patent [19]
Schneider

[11] B 3,925,635
[45] Dec. 9, 1975

[54] PRESSURE OPERATED CONTROL FOR RESISTANCE WELDING MACHINES

[75] Inventor: Bernd Schneider, Munich, Germany

[73] Assignee: Siemens Aktiengesellschaft, Berlin and Munich, Germany

[22] Filed: Nov. 15, 1973

[21] Appl. No.: 415,957

[44] Published under the Trial Voluntary Protest Program on January 28, 1975 as document no. B 415,957.

[30] Foreign Application Priority Data
Nov. 23, 1972 Germany............ 2257537

[52] U.S. Cl. .................................. 219/89
[51] Int. Cl.² ............................. B23K 11/10
[58] Field of Search.............. 219/89, 109, 110

[56] References Cited
UNITED STATES PATENTS

| | | | |
|---|---|---|---|
| 2,286,104 | 6/1942 | Platz | 219/89 |
| 2,306,593 | 12/1942 | Collom | 219/110 |
| 2,824,949 | 2/1958 | Vltavsky | 219/89 X |
| 3,076,087 | 1/1963 | Boretti | 219/89 |

*Primary Examiner*—J. V. Truhe
*Assistant Examiner*—Kenneth W. Hairston
*Attorney, Agent, or Firm*—Hill, Gross, Simpson, Van Santen, Steadman, Chiara & Simpson

[57] ABSTRACT

Pressure operated control for resistance welding machines in which a fluid pressure cylinder and piston operates the pressure electrode and is connected to a source of fluid under pressure. The pressure electrode is pressed into engagement with a workpiece over an anvil electrode. The control is such that the electrodes are not energized until the pressure of the pressure electrode on the workpiece reaches a predetermined pressure.

9 Claims, 2 Drawing Figures

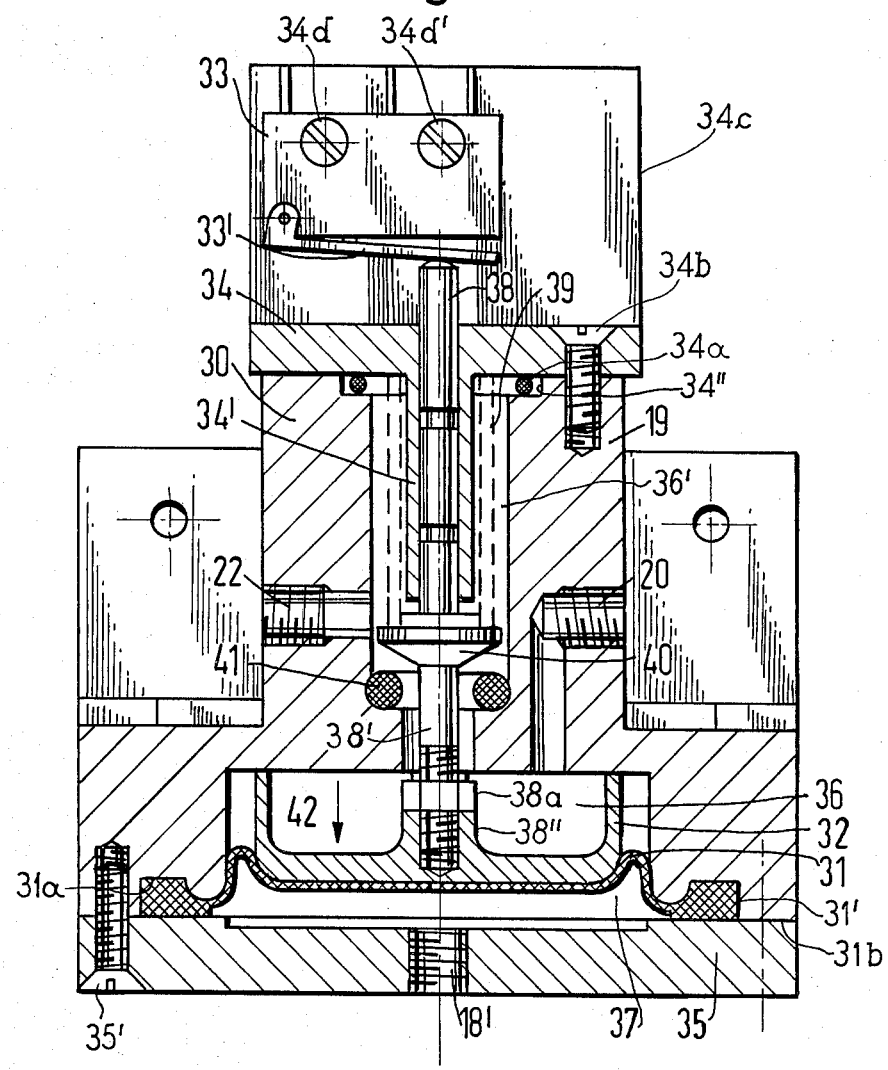

PRESSURE OPERATED CONTROL FOR RESISTANCE WELDING MACHINES

FIELD OF THE INVENTION

Pressure operated control for energizing the electrodes of a resistance welding machine in accordance with the pressure of the pressure electrode on the workpiece.

BACKGROUND, SUMMARY AND ADVANTAGES OF THE INVENTION

It is known that in resistance welding, the contact resistances are pressure-dependent so the pressure force of the electrodes on the workpiece during welding has a marked effect on the heating process. The efficiency of welding is, therefore, dependent upon the degree of the pressure of the pressure electrode upon the workpiece and the time characteristic of this force. For this reason, to provide equality and stability of the welding connections, it is essential that the welding electrode be energized when the pressure of the electrode on the workpiece reaches a predetermined pressure.

Resistance welding machines have been developed in which the welding current is not turned on until the pressure of the electrode on the workpiece reaches a predetermined value. This has been determined by the pressure of compressed air in the pressure cylinder engaging the pressure electrode with the workpiece and is governed by a preset valve in the pressure cylinder. The controls serving to operate this type of resistance welding machine to effect extensible and retractable movement of the welding machine to effect extensible and retractable movement of the welding electrode relative to its pressure cylinder and to set the pressure force and energize the welding electrodes are extremely expensive. Such controls are not adaptable to convert a resistance welding machine having "path-dependent control" into a resistance welding machine having "pressure-dependent control" without materially affecting the construction of the welding machine.

An advantage of the present invention is that a pressure-dependent control device for a resistance welding machine has been provided, operated by compressed air and of a simple, compact and efficient construction which may also be used to convert a resistance welding machine having "path-dependent control" into one with pressure-dependent control."

This advantage is attained by the use of a valve in the pressure line which exhausts air from the air cylinder in one position of the pressure line and in another position connects this pressure line to a source of fluid under pressure and by a pressure sensitive valve and energizing switch and by arranging this pressure sensitive valve and switch upstream of a check valve to supply fluid under pressure to the pressure cylinder to engage the pressure electrode with the workpiece in one position of the valve and to close the vlave and pressure switch upon engagement of the pressure electrode with the workpiece at the time the pressure of the pressure electrode on the workpiece reaches a predetermined value.

Another advantage of the control of the present invention is that it is possible to control the engagement and release of the pressure electrode with the workpiece through a simple manually operated control valve and to materially reduce the components of the control over former controls.

A further advantage of this invention is that the control may be arranged outside of the pressure cylinder and the other operative components of the resistance welding machine to be readily accessible, and adaptable to be applied to a resistance welding machine having path-dependent control, without modifying the construction of the machine.

A further feature of the invention is the use of a pressure-dependent switching valve in the form of a diaphragm-operated valve having two chambers separated by a diaphragm, in which the first chamber is connected to the pressure side of the cylinder operating the welding electrode through a change-over valve and in which the second chamber is connected to supply pressure to open the pressure-operated valve and switch through a throttle valve set to a predetermined pressure and accommodating the operation of the control switch for the welding electrode to energize the electrode by the pressure of the pressure electrode on the workpiece.

In carrying out the invention, the switch controlling the energization of the welding electrode is connected with the timer supplying the welding current pulse in the correct magnitude and time duration and when the welding current pulse has been set and the welding operation has been completed, a control valve is operated to effect withdrawal of the pressure electrode from the workpiece.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

In the drawings, FIG. 1 schematically shows a form of control for the welding electrodes in accordance with the principles of the present invention; and FIG. 2 diagrammatically illustrates a form of pressure-dependent valve and switch which may be used in the control to carry out the principles of the present invention.

DESCRIPTION OF PREFERRED FORM OF INVENTION

Figure 1:
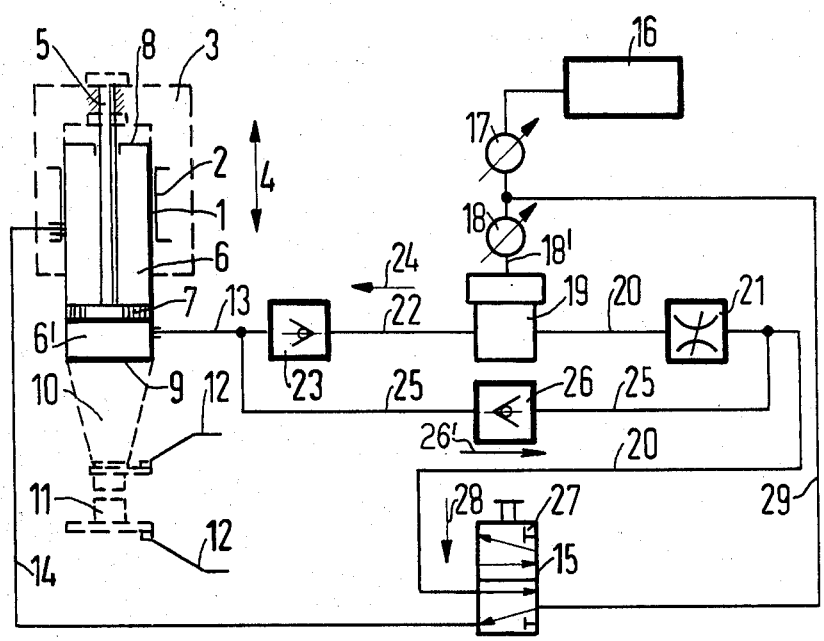

With reference to the embodiment of the invention illustrated in FIGS. 1 and 2, FIG. 1 schematically shows a pressure cylinder 1 effective to move a pressure electrode 10 toward and from a workpiece. The cylinder 1 is diagrammatically shown as being guided in vertical guides 2 on a mounting plate 3 for movement in the directions of the arrow 4 to move the pressure electrode 10 toward and from a workpiece (not shown) and an anvil electrode 11 to engage the workpiece with a predetermined pressure. The circuit is shown as a compressed air circuit, but it need not necessarily be such a circuit and may be various other forms of pressure circuits.

A piston rod 5 extends along the cylinder 1 and has a piston 7 carried on its free end within the cylinder 1. The piston rod 5 extends upwardly through a cylinder head 8 and is fixed at its upper end to the mounting plate 3 in a suitable manner. The head end of the cylinder 1 is closed by a cylinder head 9 forming a support for the welding electrode 10, shown diagrammatically as depending therefrom. The piston 7 thus divides the cylinder 1 into a chamber 6 along which the piston rod 5 extends and into a chamber 6' effecting movement of the welding electrode 10 into engagement with the workpiece upon the supply of fluid under pressure thereto.

It should be understood that the anvil electrode 11 and pressure electrode 10 energized through the welding supply lines 12 are energized through a welding current transformer and a welding current pulse generator, which are not herein shown or described since they are of a form well known to those skilled in the art. A pressure line 13 leads through the head end of the cylinder 1 and to the chamber 6' to effect lowering of the pressure electrode 10 toward anvil electrode 11 upon the supply of fluid under pressure to said end of said cylinder through the pressure line 13. A pressure line 14 leads to the chamber 6 of the cylinder 1 to effect raising of the cylinder 1 along the piston rod 5 upon the supply of fluid under pressure to said cylinder through the pressure line 14. The control and release of fluid under pressure, which may be compressed air, to the chambers 6 and 6' is through a manually operable change-over valve 15 connected with a source of fluid under pressure 16 through a pressure line 29 having an adjustable valve 17 therein. Where the system is a compressed air system, the source of pressure may be an air compressor and receiver tank. The change-over valve 15 may be of a construction well known to those skilled in the art so need not herein be shown or described in detail.

A pressure-dependent valve 19 is provided in series with the change-over valve 15 to control the supply of fluid under pressure to the chamber 6' and engage the pressure electrode 10 with the workpiece. The valve 19 is connected with the pressure line 13 through a pressure line 22 and check valve 23 set to accommodate the flow of fluid under pressure only to the pressure line 13 in the direction of the arrow 24 and to prevent back-pressure in the pressure line 22. The pressure operated valve 19 is supplied with fluid under pressure from the pressure line 29 through the valve 15 and pressure line 20 having an adjustable throttle valve 21 connected therein.

The release of fluid pressure from the chamber 6' is through a bridging return line 25 bridging the check valve 23 and pressure lines 20 and 22 and pressure operated valve 19. The bridging return line 25 has a check valve 26 connected therein set to accommodate the flow of fluid under pressure in the direction of the arrow 26' and to prevent the supply of fluid under pressure in an opposite direction.

In the position of the valve 15 shown in FIG. 1, the valve supplies fluid under pressure from the pressure line 29 through the pressure line 14 to the chamber 6 of the cylinder 1, to effect raising movement of the cylinder 1 along the piston rod 5, to move the welding electrode away from the workpiece. In this same position of the valve 15, fluid under pressure is released through the line 13, return line 25 and check valve 26 and line 20 where it is vented to atmosphere through the valve 15.

Upon operation of a slide 27 of the change-over valve 15, in the direction of the arrow 28, the valve may be moved into position to supply fluid under pressure to the pressure line 20 to the pressure line 13 under the control of the throttle valve 21, the pressure operated valve 19 and check valve 23 to pressurize the chamber 6' and engage the welding electrode with the workpiece. At the same time, pressure is released in the chamber 6 of the cylinder 1 through the return line 14 and valve 15. This accommodates free engagement of the pressure electrode 10 with the workpiece. The valve slide 27 is thus moved in the direction of the arrow 28 from the position shown in FIG. 1, to engage the pressure electrode 10 with the workpiece and is moved in a return direction to move the pressure electrode 10 away from the workpiece when the valve 15 is in the position shown in FIG. 1.

If the pressure electrode 10 is in contact with a workpiece, a pressure will be built up in the pressure-dependent valve 19. When the built-up pressure reaches the pressure set on a throttle valve 18, a valve 40 of the pressure-dependent valve 19 (FIG. 2) will close and a pressure operated switch 33 (FIG. 2) will also close to energize the electrodes 10 and 11 and effect a welding operation. After the electrodes 10 and 11 have been energized by the pressure operated switch 33, the valve 15 may be moved by operating the slide 27 into the position shown in FIG. 1, to admit fluid under pressure to the cylinder chamber 6 and release fluid under pressure from the chamber 6'. This will effect raising of the pressure electrode 10 above the workpiece.

Referring now in particular to a preferred form of pressure-dependent valve 19, as shown in FIG. 2, the valve itself includes a valve block 30 having the inlet 20 leading into one side thereof and the pressure outlet 22 leading from the opposite side thereof. The valve block has a pressure chamber 36 formed therein in communication with the pressure line 20 and supplied with fluid under pressure through said pressure line. The pressure chamber 36 is defined by a flexible diaphragm 31 and a diaphragm plate 32. The diaphragm 31 may be a conventional form of a diaphragm commonly used in pressure operated valves or other devices and has an annular rim 31' extending about the perimeter thereof and recessed within an annular groove 31a formed in an end 31b of the valve block 30. The rim 31' is retained to the annular groove 31a in sealing engagement with respect to said groove to seal the pressure chamber 36 by a cover plate 35 secured to the end of the valve block as by machine screws 35'. The diaphragm 31 thus forms the pressure chamber 36 in communication with the pressure passageway 20 and a pressure chamber 37 on the opposite side of said diaphragm and in communication with a pressure passageway 18' connected with the source of supply of fluid under pressure through the settable control valve 17 and a settable valve 18, which may be a throttle valve, set by turning movement of the handle for said valve, and diagrammatically designated by a line extending through the center of the valve and having an arrow on the outer end thereof. The throttle valve 18 thus supplies the pressure chamber 37 with fluid under pressure through the pressure inlet 18' and determines the welding pressure.

The valve 40 is movable within a valve chamber 36' in communication with the pressure chamber 36 and closed by a cover plate 34. The cover plate 34 closes the opposite side of the valve block from the cover plate 35, and is sealed to said valve block as by an O-ring 34a in a shouldered recess 34" opening to the opposite end of the valve block from the chamber 37. Machine screws 34b are shown as retaining the cover plate 34 to the end of the valve block in sealing engagement therewith.

The cover plate 34 is shown as having a right-angled bracket 34c extending outwardly therefrom and forming a mounting for the welding current triggering switch 33, secured to said cover plate as by machine screws 34d. The switch 33 may be a conventional form of micro-switch operated by a lever arm 33' transversely pivoted to the body of said switch and engaged by a plunger 38 slidably guided in the cover plate 34 and a depending guide 34' extending inwardly of said cover plate along the center of the valve chamber 36'. The plunger 38 is shown as having the valve 40 mounted on the inner end thereof and as biased into a closed position by a compression spring 39 encircling the guide 34' and interposed between the inner wall of the cover plate 34 and the valve 40.

The valve 40 is herein shown as being a poppet-type of valve engageable with the seat 41 when in its closed position to block the flow of fluid under pressure from the pressue passageway 20 through the axially aligned passageway 22 when the valve is in its closed position. The valve 40 has a stem 38' depending therefrom and threaded in a boss 38" extending upwardly of the diaphragm plate 32 coaxial with the center thereof. A nut 38a may be provided to lock the valve stem 38' to the diaphragm plate 32.

During operation of the valve when welding, the pressure chamber 37 is supplied with fluid under pressure through the inlet 18' in accordance with the pressure of the fluid set by the throttle valve 18. Pressure in the pressure chamber 37 will thus hold the valve 40 in the open position shown. In this position of the valve, the welding current triggering switch 33 is also open. If the valve 15 is moved in the direction of the arrow 28 to supply fluid under pressure through the pressure line 20 and to the pressure chamber 36, and the pressure in the chamber 37 is sufficient to open the valve 40, said valve will be moved into the open position shown in FIG. 2 and pressure will be supplied through the valve block 30 and a check valve 23 to depress the welding electrode 10 into engagement with the workpiece. In the open position of the valve 40, the triggering switch 33 will also be opened. As the pressure electrode 10 is contacted with the workpiece, the pressure in the chamber 36 will be built up and when the pressure in the chamber 36 overbalances pressure in the pressure chamber 37, the valve 40 and diaphragm plate 32 will move in the direction of the arrow 42 to close the valve. The plunger 38 following the valve will release the switch arm 3' and effect closing of the triggering switch 33. A welding pulse will now be produced to energize the electrodes 10 and 11.

As the valve 15 is reset into the position shown in FIG. 1, fluid under pressure will be released from the cylinder chamber 6' through the bridging return line 25 and pressure in the pressure chamber 37 will again predominate to effect opening of the valve 40 and the welding current triggering switch 33.

I claim as my invention:

1. In a pressure actuated control for energizing the electrodes of a resistance welding machine having a stationary anvil electrode,
   a movable presure electrode,
   means engaging pressure electrodes with a workpiece between said electrodes and pressurizing the pressure electrode to a predetermined pressure,
   a source of fluid under pressure,
   a fluid pressure cylinder,
   a piston within said cylinder,
   pressure inlets into said cylinder on opposite sides of said piston,
   the admission of fluid under pressure to one side of said piston raising the pressure electrode above the workpiece and pressure on the opposite side of said piston engaging the pressure electrode with the workpiece,
   a pressure-dependent triggering switch controlling the energization of said electrodes,
   a first valve controlling the supply and release of fluid under pressure to opposite sides of said piston,
   a pressure supply line from said source of supply of fluid under pressure to said first valve,
   individual first and second pressure lines leading from said first valve to said cylinder, on opposite sides of said piston,
   a second valve operated by fluid under pressure for controlling the supply of fluid under pressure to effect lowering of the pressure electrode to engage the workpiece with a predetermined pressure,
   means for setting the pressure of closing of said pressure switch to a pre-set pressure of engagement of said pressure electrode with the workpiece,
   including a throttle valve,
   an operative connection from said second valve to said pressure-dependent switch, to effect closing of said switch upon the building of a predetermined pressure on the workpiece by said pressure electrode,
   a check valve holding fluid under pressure in the end of said cylinder pressurizing said pressure electrode,
   a bridging line bridging said first check valve and said second valve and having a check valve therein set to prevent the building up of pressure in said bridging line and to accommodate the release of fluid under pressure in the end of said cylinder pressurizing said pressure electrode.

2. In a pressure actuated control for energizing the electrodes of a resistance welding machine having a stationary anvil electrode,
   a movable pressure electrode,
   means engaging said electrodes with a workpiece between said electrodes and pressurizing the pressure electrode to a predetermined pressure,
   a source of fluid under pressure,
   a fluid pressure cylinder,
   a piston within said cylinder,
   pressure inlets into said cylinder on opposite sides of said piston,
   the admission of fluid under pressure to one side of said piston raising the pressure electrode above the workpiece and pressure on the opposite side of said piston engaging the pressure electrode with the workpiece,
   a pressure-dependent triggering switch controlling the energization of said electrodes,
   a first valve controlling the supply and release of fluid under pressure to opposite sides of said piston,
   a pressure supply line from said source of supply of fluid under pressure to said first valve,
   individual first and second pressure lines leading from said first valve to said cylinder, on opposite sides of said piston,
   a second valve operated by fluid under pressure for controlling the supply of fluid under pressure to effect lowering of the pressure electrode to engage the workpiece with a predetermined pressure, means for setting the pressure of closing of said pressure switch to a pre-set pressure of engagement of said pressure electrode with the workpiece, including a throttle valve, an operative connection from said second valve to said pressure-dependent switch, to effect closing of said switch upon the building up of a predetermined pressure on the workpiece by said pressure electrode, a check valve holding fluid under pressure in the end of said cylinder pressurizing said pressure electrode, a bridging line bridging said first check valve and said second valve and having a check valve therein set to prevent the building up of pressure in said bridging line and to accommodate the release of fluid under pressure in the end of said cylinder pressurizing said pressure electrode, and means operating said pressure operated valve and triggering pressure switch comprising a diaphragm, a fluid connection from said throttle valve to said diaphragm on one side thereof, and a fluid connection from said first valve to said second valve for supplying fluid under pressure to the opposite side of said diaphragm from said first-mentioned fluid connection, to supply the pressure through said second valve to engage the pressure electrode with the workpiece and to build up sufficient pressure on said diaphragm to effect closing of said second valve and closing of said pressure-dependent triggering switch.

3. The pressure actuated control of claim 2, wherein the throttle valve is adjustable to regulate the pressure of fluid supplied to said diaphragm to effect opening of said second valve and triggering switch and to hold said valve and switch and to hold said valve and switch open until said diaphragm is forced to close by pressure of the pressure electrode on the workpiece.

4. The pressure actuated control of claim 3, including a check valve holding fluid under pressure in the end of said cylinder pressurizing said pressure electrode, and p1 a bridging line bridging said first check valve and second valve and having a check valve therein set to prevent the building up of pressure in said bridging line and to accomodate the release of fluid under pressure in the end of said cylinder pressurizing said pressure electrode.

5. The pressure actuated control of claim 3, wherein the second valve and triggering switch are springbiased in a closed direction, and wherein the operative connection from said second valve to said pressure switch is a direct connection.

6. The pressure actuated control of claim 4, wherein a throttle valve is in the pressure line supplying fluid under pressure to said cylinder to effect engagement of said pressure electrode with the workpiece.

7. The pressure actuated control of claim 5, including a manually adjustable reducing valve in said pressure line supplying said first valve with fluid under pressure.

8. The pressure actuated control of claim 5, wherein the first valve is positionable in one position to supply fluid under pressure to the side of said piston, raising said pressure electrode above the workpiece and to vent the opposite side of said piston to atmosphere through said bridging line and is movable into another position to supply fluid under pressure to said second valve to effect lowering of said pressure electrode into engagement with the workpiece, and to vent the opposite side of said cylinder to atmosphere through said bridging line.

9. The pressure actuated control of claim 8, including a pressure connection from said manually settable reducing valve to one side of said diaphragm to supply fluid under pressure thereto to open said second valve and maintain the pressure on said diaphragm at the pressure selected by said settable throttle valve, and wherein the pressure on said diaphragm to close said second valve and open said pressure sensitive switch is determined by the building up of pressure on said diaphragm by the pressure of engagement of the pressure electrode with the workpiece.

\* \* \* \* \*